(12) United States Patent
Gatti

(10) Patent No.: US 6,852,785 B1
(45) Date of Patent: Feb. 8, 2005

(54) VULCANIZABLE ELASTOMERIC COMPOSITIONS FOR USE AS TIRE TREADS

(75) Inventor: Louis F. Gatti, Grand Island, NY (US)

(73) Assignee: Dunlop Tire Corporation, West Seneca, NY (US)

( * ) Notice: Subject to any disclaimer, the term of this patent is extended or adjusted under 35 U.S.C. 154(b) by 0 days.

(21) Appl. No.: 10/069,299

(22) PCT Filed: Apr. 22, 1999

(86) PCT No.: PCT/US99/08838

§ 371 (c)(1),
(2), (4) Date: Oct. 19, 2001

(87) PCT Pub. No.: WO00/64968

PCT Pub. Date: Nov. 2, 2000

(51) Int. Cl.7 ............................ C08K 3/30; C08K 3/22; C08L 9/00
(52) U.S. Cl. ....................... 524/423; 497/571; 152/905
(58) Field of Search ................................. 524/423, 495, 524/497, 571, 575; 152/209.1, 905

(56) References Cited

U.S. PATENT DOCUMENTS

| | | | | |
|---|---|---|---|---|
| 3,878,147 A | * | 4/1975 | Craven | 523/150 |
| 4,237,173 A | * | 12/1980 | Kuan | 428/65 |
| 4,788,231 A | * | 11/1988 | Smigerski et al. | 523/334 |
| 4,883,829 A | * | 11/1989 | Smigerski et al. | 523/334 |
| 5,063,268 A | * | 11/1991 | Young | 524/286 |
| 5,310,815 A | * | 5/1994 | Senyek et al. | 525/329.3 |
| 5,508,333 A | * | 4/1996 | Shimizu | 524/424 |
| 6,127,488 A | * | 10/2000 | Obrecht et al. | 525/333.3 |
| 6,274,662 B1 | * | 8/2001 | Lynch et al. | 524/423 |

* cited by examiner

Primary Examiner—Callie Shosho
(74) Attorney, Agent, or Firm—Phillips Lytle LLP

(57) ABSTRACT

Vulcanizable elastomeric compounds having enhanced viscoelastic properties include 100 parts by weight of at least one diene-based elastomer, and from about 30 to about 160 phr of filler. The filler may contain zinc sulfate (with an average particle size of about 0.5–1.0 microns), barium sulfate (with an average particle size of about 1.0–2.0 microns) and/or titanium dioxide (with an average particle size of about 0.05–1.0 microns).

8 Claims, No Drawings

VULCANIZABLE ELASTOMERIC COMPOSITIONS FOR USE AS TIRE TREADS

TECHNICAL FIELD

This invention relates generally to vulcanizable elastomeric compounds having enhanced viscoelastic properties, and, more particularly, to improved elastomeric compositions having 100 parts by weight of at least one diene-based elastomer and from 30 to 160 phr (parts per hundred parts of Lubber by weight) of fillers, which include compounds of zinc, barium and/or titanium.

BACKGROUND ART

Elastomeric compounds are so-called viscoelastic materials. This means that the properties which they exhibit depend on the duration (time or frequency) and on the temperature at which external stresses or deformations (strains) are applied to them.

The balance and level of such viscoelastic properties determine the processibility and the range of end-use characteristics of these elastomeric compounds, and, therefore, their practical applications. With present technologies, a wide range of applications is possible due to the fact that the basic constituents of these elastomeric compounds, namely, naturally-occurring or synthetically-produced rubbers, can be mixed or compounded with numerous chemicals and other additives, so as to tailor and customize their viscoelastic properties. The technology of developing vulcanizable elastomeric compounds for specific applications has achieved a high degree of sophistication over the past years.

As a result of developments in electronics and dynamic test equipment, great advances have also been made in the precise measurement of viscoelastic properties of elastomeric compounds, and also in the correlation of such measurements with the performance of these compounds in engineered products, such as tires.

Pertinent viscoelastic parameters, which are measured in laboratory tests, are the elastic moduli, E' (in tension or compression) and G' (in shear), the viscous moduli E" (in tension or compression) and G" (in shear), and the ratio of the viscous and elastic moduli, otherwise known as the loss tangent or tan $\delta$. These parameters are determined under dynamic conditions at specific temperatures, frequencies, stain rates, and stress- or stain-amplitudes. Another important parameter is the glass transition temperature, $T_g$, which is the temperature below which the elastomeric composition becomes "glass-like" or brittle.

With present testing technology, these viscoelastic parameters can be determined with great precision, and these parameters can be confidently correlated to practical performance characteristics in, say, tires. For instance, with tire tread compounds, the tan $\delta$ of a compound, measured within a temperature range of about 50-70° C., correlates directly with the rolling resistance of a tire. That is, the lower the tan $\delta$ the lower the rolling resistance of a tire tread. Similarly, the magnitude of the tan $\delta$ or E', measured at about 0° C., or at the respective $T_g$ of a tire tread compound, relate to certain traction characteristics of a tire, whereas the magnitude of the tan $\delta$ at very low temperatures of about −65° C. is indicative of the abrasion or wear characteristics of a tire tread. Regarding traction and wear, the greater the values of the respective viscoelastic parameters, the better the performance of the compounds in tire treads.

To be specific, with respect to predicting the potential rolling resistance of tire tread compounds, differences in tan $\delta$ of 0.005 are significant and beyond experimental error, while changes of 0.015 and greater are significant with respect to certain traction characteristics and can be observed in actual tire performance tests.

In practice, there are opposing performance trends of elastomeric compounds, which usually requires compromises when optimizing their viscoelastic properties. For instance, improvements in the tan $\delta$ leading to a lower rolling resistance of tire tread compounds we generally also accompanied by a reduction of tan $\delta$ at other relevant temperatures, thus resulting in a potentially lower wet traction performance of the tire tread. Similarly, there are generally also opposing trends with respect to certain properties, such as traction capabilities of tire tread compounds and their abrasion or wear resistance characteristics.

Much effort has been spent on developing compounding technologies and new compound additives to ameliorate this problem of opposing property trends while raising the overall performance levels. Great progress has been made through what is now commonly referred to as "silica compounding" technology, but there is still need for further technical improvements. The present invention demonstrates that this is now possible.

DISCLOSURE OF THE INVENTION

The present invention relates generally to the field of vulcanizable elastomeric compositions.

In one aspect, an improved elastomeric composition includes 100 parts by weight of at least one diene-based elastomer, and from 30 to 160 phr of filler, the filler comprising at least about 7 phr of zinc sulfate.

In another aspect, an improved elastomeric composition includes 100 parts by weight of at least one diene-based elastomer, and from 30 to 160 phr of filler, the filler comprising at least 7 phr barium sulfate.

In yet another aspect, the improved elastomeric composition includes 100 parts by weight of at least one diene-based elastomer, and from about 30 to 160 parts of filler, the filler comprising at least 3 phr titanium dioxide, and also containing at least one compound selected from the group consisting of silica, carbon black, clay, calcium carbonate, and talc.

The mean particle size of zinc sulfate, barium sulfate and titanium dioxide particles is between about 0.2 and 1.6 microns and accounts for between 10 and 30 weight percent of the filler.

Accordingly, the general object of the invention is to provide improved vulcanizable elastomeric compositions.

Another object is to provide improved elastomeric compositions employing zinc sulfate, barium sulfate or titanium dioxide as filler material.

These and other objects and advantages will become rent from the foregoing and ongoing written specification, and the appended claims.

DESCRIPTION OF THE PREFERRED EMBODIMENTS

The present invention deals with a novel compounding technology through the use of a new class of additives. As a results the opposing property trends of conventional elastomeric compounds are minimized, while the overall performance level of compounds is greatly improved.

In general, the nature of the elastomer determines the basic properties of vulcanizable elastomeric compounds.

With current technologies, these properties are modified by the kind and amount of compounding ingredients that are used. These ingredients include processing aids, fillers, softeners, vulcanizing chemicals, chemicals protecting against aging, blowing agents, etc. All these conventionally-used materials are compatible with compounds of the present invention. However, the present invention uses an new group of compounding aids to achieve the desired novel balance and level of viscoelastic properties.

Commonly-used elastomers, which are compatible with the novel compounding technology of this invention, include natural rubber, or synthetic elastomers, based on mono, copolymers or terpolymers from butadiene, isoprene, isobutylene, styrene, acrylonitrile, chlorobutadiene, ethylene, propylene, dicyclopentadiene, ethylene norbornene, hexadiene, vinyl acetate, chorosulfonyl ethylene, epichlorohydrin, ethylene oxide, or propylene oxide. Blends from these elastomers can also be employed within useful blend ratios. In addition fluoroelastomers, silicone rubbers, polysulfide rubbers, and polyurethane ane rubbers are also compatible with the compounding technology of this invention.

Fillers, which are compatible with the novel compounding technology of this invention can be generally classified as carbon blacks or light-colored fillers. The carbon blacks comprise a wide range of grades, and there is no restriction on surface area, surface activity, particle size, or aggregate structure. Light fillers include colloidal silica, calcium silicate, aluminum silicate, alumina gel, clay, talcum, or calcium carbonate (i.e., chalk). Again, there is no restriction on the particle size, aggregate size, or the surface activity of these light fillers. The surface activity of carbon blacks and light fillers can also be modified with appropriate chemicals according to current technologies. It is also possible to employ blends of carbon black grades, light fillers, or carbon blacks and light fillers in compounds of the present invention.

It is also possible to use plasticizers, process aids, factices, mineral oils, bonding resins, reinforcing resins, tackifiers, blowing agents and various aging-, fatigue-, and ozone-protective agents.

The elastomeric compositions of this invention can be vulcanized using current technologies. These include accelerated sulfur systems, sulfur donors, peroxides, curing resins and high energy radiation. Combinations of any of these systems can also be employed.

The following examples will illustrate the nature of the novel compounding technology. In these examples, all compounds contained 100 parts by weight of at least one diene-based elastomer.

EXAMPLE 1

Six compounds were prepared under identical conditions to demonstrate the properties of rolling resistance, traction, and wear of tire tread compounds using modern compounding technology based on carbon black and silica fillers, and the significant and unexpected improvements that can be obtained with the compounding technology of the present invention.

All compounds had the same type and concentration of elastomers, namely a blend of two solution SBR's (synthetic styrene-butadiene rubber), and the same sulfur/accelerator cure system, protective agents, oils, and process aids. The total filler concentration was held constant at 35% by weight throughout, but different filler types were used.

Compound A (Control 1) is a modern low-rolling-resistance, high traction passenger tire tread, based on the latest silica compounding technology. Here, the filler was a blend of 45 phr silica with a surface area of 180 $m^2$ per gram of silica. The surface of the silica was modified with a silane coupling agent and of 25 phr carbon black (ASTM grade N134), which has a high surface area and high structure (i.e., degree of aggregation of primary particles).

Compound B (Control 2) is a modern long-wearing high-traction passenger tread compound using carbon black filler only (70 phr of ASTM Grade N134).

Compound C (Control 3) is a modern high-traction, low-rolling-resistance passenger tread using carbon black filler with lower surface area than that of Control 1 (a blend of 35 phr of ASTM GradeN343 carbon black, and 35 phr of ASTM Grade N351 carbon black).

Compounds D, E and F were compounded using the novel technology of this invention. The fillers in Compound D were 61.5 phr carbon black (i.e., blend of N343 and N351) plus 8.5 phr zinc sulfate with mean particle size of 0.7 microns. In Compound E, the fillers were 61.7 pr carbon black (blend of N343 and N351) plus 8.3 phr barium sulfate with mean particle size of 1.6 microns. In Compound F, the fillers were 60.8 phr carbon black (blend of N343 and N351) plus 92 phr titanium dioxide of mean particle size of 0.2 microns.

The viscoelastic properties of these six compounds were determined using a Rheometrics RSA dynamic tester in uniaxial extension over a range from −70° C. to +60° C., and a dynamic strain amplitude of 0.5% with a 10% prestrain at a frequency of 10 Hertz. From these measurements, the glass transition temperature $T_g$ and the tan δ values at −25° C., 0° C. and 50° C. were determined. These data are summarized Table 1:

TABLE 1

|  | Compound A Control 1 | Compound B Control 2 | Compound C Control 3 | Compound D | Compound E | Compound F |
|---|---|---|---|---|---|---|
| $T_g$ °C. | −28.4 | −28.1 | −30.1 | −28.3 | −28.5 | −28.2 |
| tan δ @ 50° C. | 0.20 | 0.28 | 0.23 | 0.19 | 0.19 | 0.19 |
| tan δ @ 0° C. | 0.34 | 0.44 | 0.37 | 0.32 | 0.34 | 0.33 |
| tan δ @ −25° C. | 0.86 | 0.92 | 0.96 | 0.90 | 0.90 | 0.87 |

When comparing the results for the Compound A (silica filler) and Compound B (high surface area carbon black), the predicted advantage of Compound A for lower rolling resistance (lower tan δ @ 50° C.) is obvious, albeit at the expense of traction (lower tan δ @ 0° C.) and treadwear.

If we next compare Compound B (high surface area carbon black) and Compound C (carbon black with lower surface area), we observe the expected improvement in rolling resistance, although not to the level of the silica compound (Compound A), but a reduced level of traction.

Therefore, these data demonstrate the limitations of current compounding technology due to the opposing property trends as mentioned above.

Now consider the significant results for Compounds D, E and F, which incorporate the technology of the present invention. Here, the consistently lowest tan δ @ 50° C. values (lowest rolling resistance) is apparent even when compared to the silica compound (Control 1), without sacrificing traction or wear. It should also be noted that the compounds based on the technology of this invention offer significant cost savings over silica-based compounds.

EXAMPLE 2

This example was included to demonstrate that the technology of the present invention can also beneficially be applied to compounds formulated with a different elastomer system, and that compounds with a high-surface-area carbon black can also be significantly improved with respect to rolling resistance at largely equivalent traction capabilities.

To this end, five compounds were prepared under identical conditions. Common to all compounds was the elastomer system, namely a blend of 70 parts by weight of two solution SBR's (synthetic styrene-butadiene rubber) and 30 parts by weight of natural rubber. The same protective agents, oils, and process aids and sulfur/accelerator cure system were also used throughout, but for the silica-based Compound A, the sulfur/accelerator ratio had to be adjusted to maintain equivalent cure rates of the compounds in this series. The total filler concentration was held constant at 33% by weight throughout, but different filler types were used.

Compound A (Control 1) is based on the latest silica compounding technology to give a very low-rolling-resistance, high traction passenger tire tread. Here, the filler was a blend of 45 phr silica with a surface area of 180 m$^2$ per gm of silica. The surface of the silica was modified with a silane coupling agent and of 25 phr carbon black (ASTM grade N134), which has a high surface area and high structure.

Compound B (Control 2) represents a long-wearing, high-traction passenger tread compound using carbon black filler only (70 phr N134).

Compounds C, D and E were compounded using the novel technology of this invention. The fillers in Compound C were 61.5 phr carbon black (N134) plus 8.5 phr zinc sulfate with mean particle size of 0.7 microns. In Compound D, the fillers were 61.7 phr carbon black (N134) plus 83 phr barium sulfate with mean particle size of 1.6 microns. In Compound E, the fillers were 60.8 phr carbon black (N134) plus 9.2 phr titanium dioxide of mean particle size of 0.2 microns.

The viscoelastic properties of these five compounds were determined using the same test conditions as listed in Example 1. From these measurements, the glass transition temperature $T_g$ and the tan δ values at 0° C. and 50° C. were determined. These data are summarized in Table 2:

TABLE 2

|  | Compound A Control 1 | Compound B Control 2 | Compound C | Compound D | Compound E |
|---|---|---|---|---|---|
| $T_g$ ° C. | −28.4 | −28.1 | −28.3 | −28.5 | −28.2 |
| tan δ @ 50° C. | 0.19 | 0.29 | 0.27 | 0.26 | 0.25 |
| tan δ @ 0° C. | 0.32 | 0.44 | 0.43 | 0.43 | 0.41 |

The results demonstrate again the opposing property trends, which cannot be eliminated with current compounding technology. Compared with the high-surface-area carbon black compound (Control 2), the silica compound (Control 1) has a significantly lower rolling resistance in passenger tire treads (i.e., lower tan δ@ 50° C.) but at considerable expense of tire tread traction (i.e., lower tan δ @ 0° C.).

On the other hand, compared with Control 2, the compounds based on the technology of the present invention (Compounds C, D and E) have a significantly lower rolling resistance (i.e., lower tan δ @ 50° C.) without the precipitous loss in traction (i.e., tan δ @ 0° C.

Therefore, while certain specific compositions have been specifically described, and certain changes and modifications discussed, persons skilled in this art will readily appreciate that various additional changes and modifications thereof may be made without departing from the spirit of the invention, as defined and differentiated by the following claims.

What is claimed is:

1. A tire tread, comprising:

100 parts by weight of at least one diene-based elastomer; and from about 30 to about 160 phr of filler, said filler comprising at least 7 phr of zinc sulfate having a mean particle size of from about 0.5 to about 1.0 microns to modify the viscoelastic properties of said elastomer.

2. A tire tread as set forth in claim 1 wherein the said filler includes carbon black.

3. A tire tread as set forth in claim 1 wherein the said filler includes silica.

4. A tire tread as set forth in claim 1 wherein the aggregate amount of zinc sulfate in said filler is less than about 30 percent of the volume of said filler.

5. A tire tread as set forth in claim 1 wherein the aggregate amount of zinc sulfate is between 10 and about 30 percent by weight of said filler.

6. A tire tread, comprising:

100 parts by weight of at least one diene-based elastomer; and from about 30 to about 160 phr of filler, said filler comprising at least about 8 phr of titanium dioxide, the mean particle size of said titanium dioxide being between about 0.5 and about 1.0 microns, and wherein the aggregate amount of titanium dioxide in said filler is less than about 30 percent of the volume of said filler and the aggregate amount of titanium dioxide is between 10 and about 30 percent by weight of said filler to modify the viscoelastic properties of said elastomer.

7. A tire tread as set forth in claim 6 wherein the said filler includes carbon black.

8. A tire tread as set forth in claim 6 wherein the said filler includes silica.

\* \* \* \* \*